M. Love,
Chuck.
No. 109,434. Patented Nov. 22, 1870.
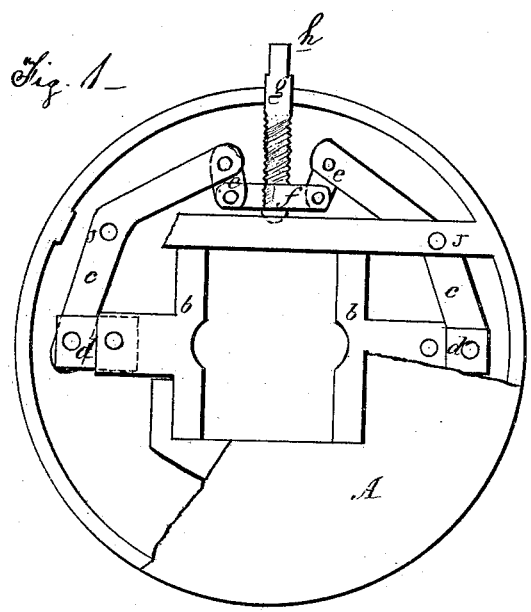
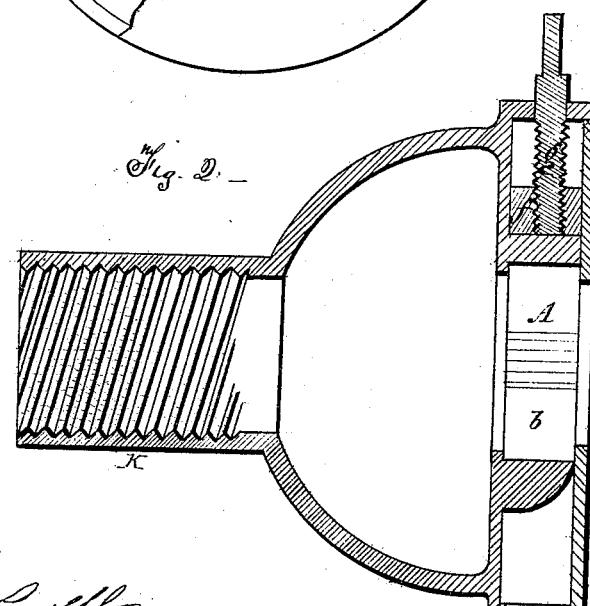
Witnesses
Inventor
Milton Love

United States Patent Office.

MILTON LOVE, OF CORRY, PENNSYLVANIA.

Letters Patent No. 109,434, dated November 22, 1870.

IMPROVEMENT IN CHUCKS.

The Schedule referred to in these Letters Patent and making part of the same.

*To all whom it may concern:*

Be it known that I, MILTON LOVE, of the city of Corry, county of Erie and State of Pennsylvania, have invented an Improved Chuck; and I do hereby declare the following to be an exact description thereof, reference being had to the accompanying drawing and to the letters of reference marked thereon making a part of this specification, in which—

Figure 1 represents a top view of the head or chuck.

Figure 2 represents a cross-section of the same.

The nature of my invention consists in the arrangement and combination of the devices forming a chuck or clutch, made of iron or other metal, for holding bolts or other irons while being cut or turned.

To enable others skilled in the art to make and use my invention, I will proceed to describe its construction and operation, as follows:

A hollow wheel, marked A in the accompanying drawing, is provided with jaws $b\ b$ in the center, which slide thereon.

The jaws are fastened to levers C C by means of attachments $d\ d$.

The levers C C are attached to a toggle, $f$, on the outside end by means of attachments $e\ e$.

The toggle $f$ is worked by means of the screw $g$, which stands upon the center of the inside of the head, at or near the center of the same, passing through the toggle $f$ to the outside of the wheel A, worked by means of a wrench or thumb-screw at $h$.

The screw, when worked forward, operates upon the toggle $f$ so as to move both levers C C and jaws $b\ b$ (the levers C C working upon their fulcrums J J together) in such a manner as to bring the jaws to the center at the same time, making a self-centering head, A.

The wheel A is so constructed as to be fastened to a hollow pipe or shaft by means of the screw K, for the purpose of being used in bolt-cutting or drilling, and to be attached to lathes or any other machines.

What I claim as my invention, and desire to secure by Letters Patent, is—

The arrangement, with the hollow head A, of the jaws $b\ b$, levers C C, attachments $e\ e$, toggle $f$, and screw $g$, when combined and operating as herein described and set forth.

MILTON LOVE.

Witnesses:
J. FRANKLIN REIGART,
OCTAVIUS KNIGHT.